(12) United States Patent
Stuewe et al.

(10) Patent No.: US 10,747,702 B2
(45) Date of Patent: Aug. 18, 2020

(54) INTERPOSER SYSTEMS FOR INFORMATION HANDLING SYSTEMS

(71) Applicant: Dell Products L.P., Round Rock, TX (US)

(72) Inventors: John R. Stuewe, Round Rock, TX (US); Walt R. Carver, Round Rock, TX (US); Stephen P. Rousset, Round Rock, TX (US); Douglas Simon Haunsperger, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 16/176,426

(22) Filed: Oct. 31, 2018

(65) Prior Publication Data

US 2020/0133907 A1 Apr. 30, 2020

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0026* (2013.01)

(58) Field of Classification Search
CPC .................................................. G06F 1/185
See application file for complete search history.

(56) References Cited

U.S. PATENT DOCUMENTS

| 6,031,292 | A | * | 2/2000 | Murakami | ............ | H01L 21/486 257/778 |
| 6,351,028 | B1 | * | 2/2002 | Akram | ................ | H01L 23/3185 257/686 |
| 2014/0089609 | A1 | * | 3/2014 | Kegel | ............... | H01L 23/49827 711/154 |
| 2016/0234962 | A1 | * | 8/2016 | Shinsato | ............... | G11B 33/128 |

\* cited by examiner

*Primary Examiner* — Henry Tsai
*Assistant Examiner* — Juanito Borromeo
(74) *Attorney, Agent, or Firm* — Baker Botts L.L.P.

(57) ABSTRACT

A computing apparatus including a printed circuit board (PCB) including a first central processing unit (CPU) socket and additional CPU socket(s); a CPU coupled to the first CPU socket; a base interposer coupled to the additional CPU socket(s); and one or more devices connected to the base interposer, wherein the base interposer provides a connection between the CPU and the one or more devices.

17 Claims, 13 Drawing Sheets

INTERPOSER SYSTEMS FOR INFORMATION HANDLING SYSTEMS

BACKGROUND

Field of the Disclosure

The disclosure relates generally to information handling systems, and, more particularly, to interposer systems for information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a computing apparatus that includes a printed circuit board (PCB) including two or more central processing unit (CPU) sockets; a CPU coupled to the primary CPU socket; a base interposer coupled to one or more of the secondary CPU socket(s); and one or more devices connected to the base interposer, wherein the base interposer provides a connection between the CPU and the one or more devices.

These and other embodiments may each optionally include one or more of the following features. For instance, the one or more devices include input/output devices and the base interposer provides the connection between the CPU and the input/output devices. The connection between the CPU and the input/output devices includes a connection between the CPU and input/output signal traces of the base interposer. The one or more devices include memory modules and the base interposer provides the connection between the CPU and the memory modules. The connection between the CPU and the memory modules includes a connection between the CPU and memory signal traces of the base interposer. The apparatus further includes a top interposer coupled to the base interposer, wherein the base interposer provides a connection between the CPU and the top interposer, and the top interposer provides a connection between the base interposer and the one or more devices. The one or more devices include input/output cable connectors and the top interposer provides the connection between the CPU and the input/output cable connectors. The one or more devices include storage devices, and the top interposer provides the connection between the CPU and the storage devices. The one or more devices include a field-programmable gate array (FPGA) devices, and the top interposer provides the connection between the CPU and the FPGA devices The one or more devices includes a peripheral component interconnect express (PCIe) devices, and the top interposer provides the connection between the CPU and the PCIe devices. The top interposer further optionally includes a signal integrity boost device.

Innovative aspects of the subject matter described in this specification may be embodied in a computing apparatus that includes a printed circuit board (PCB) including a first central processing unit (CPU) socket and a second CPU socket; a CPU coupled to the first CPU socket; and an interposer stack including: a base interposer coupled to the second CPU socket, a top interposer coupled to the base interposer, wherein a retention mechanism physically couples the top interposer to the PCB.

These and other embodiments may each optionally include one or more of the following features. For instance, the retention mechanism includes a bracket coupled to the top interposer, the bracket physically coupling the top interposer to the PCB. The computing apparatus further includes a plurality of memory sockets, wherein the bracket physically couples the top interposer to the memory sockets. The computing apparatus further includes a plurality of heat sink mounting pins, wherein the top interposer is physically coupled to the heat sink mounting pins. The heat sink mounting pins align the top interposer with the base interposer. The computing apparatus further includes one or more devices connected to the top interposer, wherein the top interposer provides a connection between the CPU and the one or more devices.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
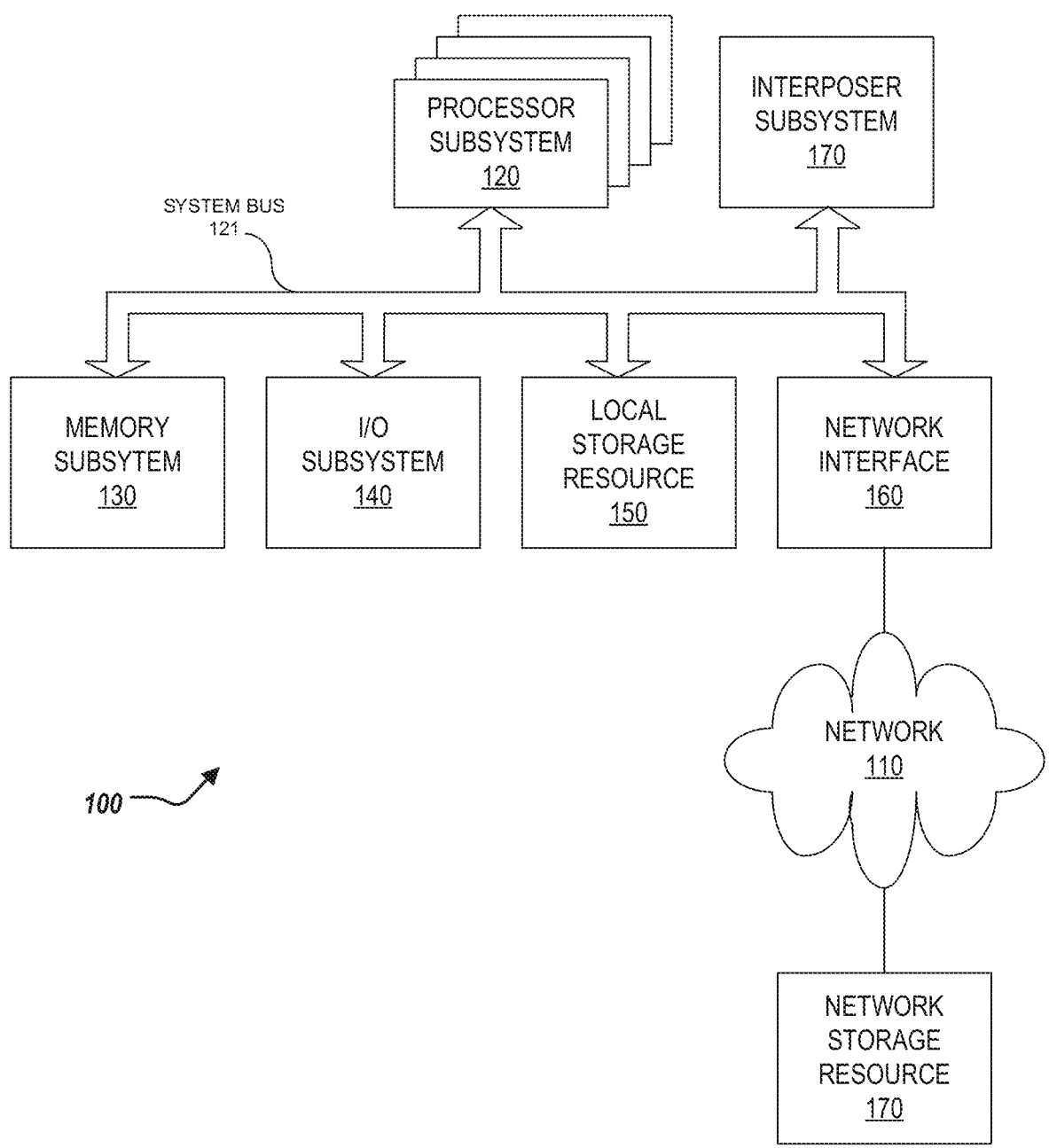
FIG. 1 is a block diagram of selected elements of an embodiment of an information handling system.

This document describes an interposer that is coupled to a CPU socket of a multiprocessor computing system design that allows the lanes of the secondary CPU socket(s) to be accessed. Specifically, a computing apparatus includes a printed circuit board (PCB) including a primary central processing unit (CPU) socket and one or more secondary CPU socket(s), a CPU coupled to the primary CPU socket, a base interposer coupled to a secondary CPU socket, and one or more devices ultimately connected to the base interposer. The base interposer can provide a connection between the primary CPU and the one or more devices. In some examples, the apparatus includes an interposer stack that includes the base interposer and a top interposer coupled to the base interposer. The top interposer provides the connection between the CPU and the devices.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include an interposer subsystem 170. The interposer subsystem 170 can be coupled to the system bus 121, such that the interposer subsystem 170 is in communication with any of the processor subsystem 120, the memory subsystem 130, the I/O subsystem 140, the local storage resource 150 and/or the network interface 160.

Figure 2A:
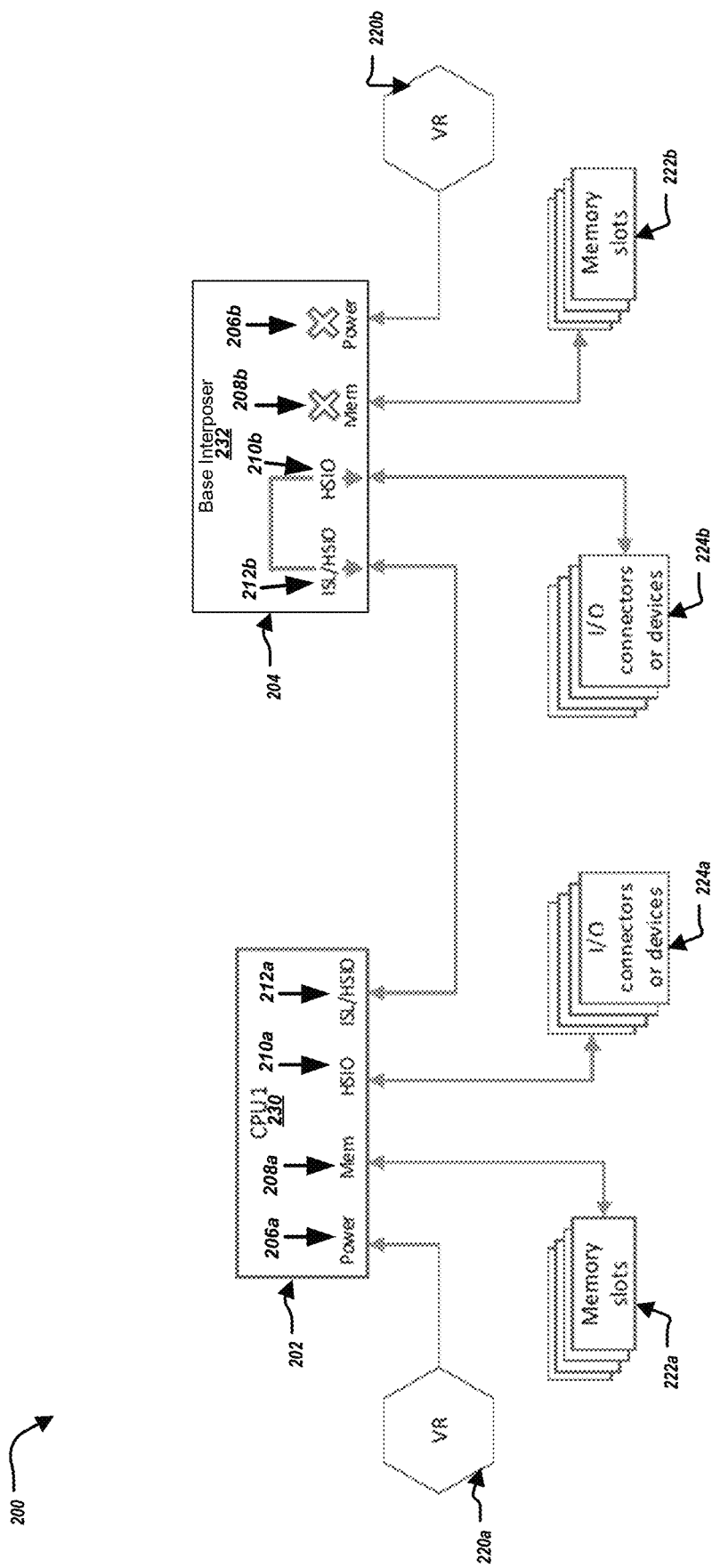
FIGS. 2A-2B, 3A-3B, 4A-4B, 5-6, and 7A-7B illustrate respective computing environments for interposers.

Turning now to FIG. 2A, FIG. 2A depicts a computing environment 200. The computing environment 200 can be implemented at a printed circuit board (PCB) (not shown). The environment 200 can include a first central processing unit (CPU) socket 202 and a second CPU socket 204. The first CPU socket 202 can be coupled to a first CPU 230 and the second CPU socket 204 can be coupled to a base interposer 232. In some examples, the interposer subsystem 170 of FIG. 1 can include the base interposer 232.

The CPU 230 (and/or the first CPU socket 202) can include a power connector 206a, a memory bus connector 208a, a high speed input/output signal (HSIO) connector 210a, and an inter-socket link (ISL/HSIO) connector 212a. The signals on connector 212a are configurable between inter-socket link and high-speed input/output.

The base interposer 232 is electrically, mechanically, and commutatively coupled to the second CPU socket 204. The base interposer 232 replaces a non-boot CPU that would typically be coupled to the second CPU socket 204. The base interposer 232 can include pads to facilitate connection with socket signal pins of the second CPU socket 204. Further, the second CPU socket 204 can include spring-loaded pins such that when the base interposer 232 is coupled with the second CPU socket 204, an electrical coupling is established between the second CPU socket 204 and the base interposer 232. To that end, similar to the CPU 230 and the first CPU socket 202, the base interposer 232 (and/or the second CPU socket 204) can include a power connector 206b, a memory bus connector 208b, a high speed input/output signal (HSIO) connector 210b, and an inter-socket link (ISL/HSIO) connector 212b.

The CPU 230 can be coupled to appropriate systems/modules through the respective connectors. For example, the power connector 206a can be connected to a voltage regulator 220a; the memory bus connector 208a can be connected to one or more memory slots 222a; the HSIO connector 210a can be connected to one or more I/O connectors (or devices) 224a; and the ISL/HSIO 212a can be connected to the ISL/HSIO 212b of the base interposer 232.

In some implementations, one or more devices can be connected to the base interposer 232 such that the base interposer 232 ultimately provides a connection between the CPU 230 and the devices. In some examples, the ISL/HSIO connector 212b of the base interposer 232 is further connected to the HSIO connector 210b of the base interposer 232 (e.g., a "hairpin" connection). As a result, the ISL/HSIO connector 212a of the CPU 230 is connected to the HSIO connector 210b of the base interposer 232 through the ISL/HSIO connector 212b—e.g., the CPU 230 is connected to the input/output signal traces of the base interposer 232. Further, this provides a connection between the CPU 230 and I/O connectors (or devices) 224b that are connected to the HSIO connector 210b of the base interposer 232. In short, signals are passed through from the CPU 230 to signal traces/connectors of the base interposer 232 from the (non-boot) second CPU socket 204. Furthermore, the power connector 206b can be connected to a voltage regulator 220b, and the memory bus connector 208b can be connected to one or more memory slots 222b.

Figure 2B:
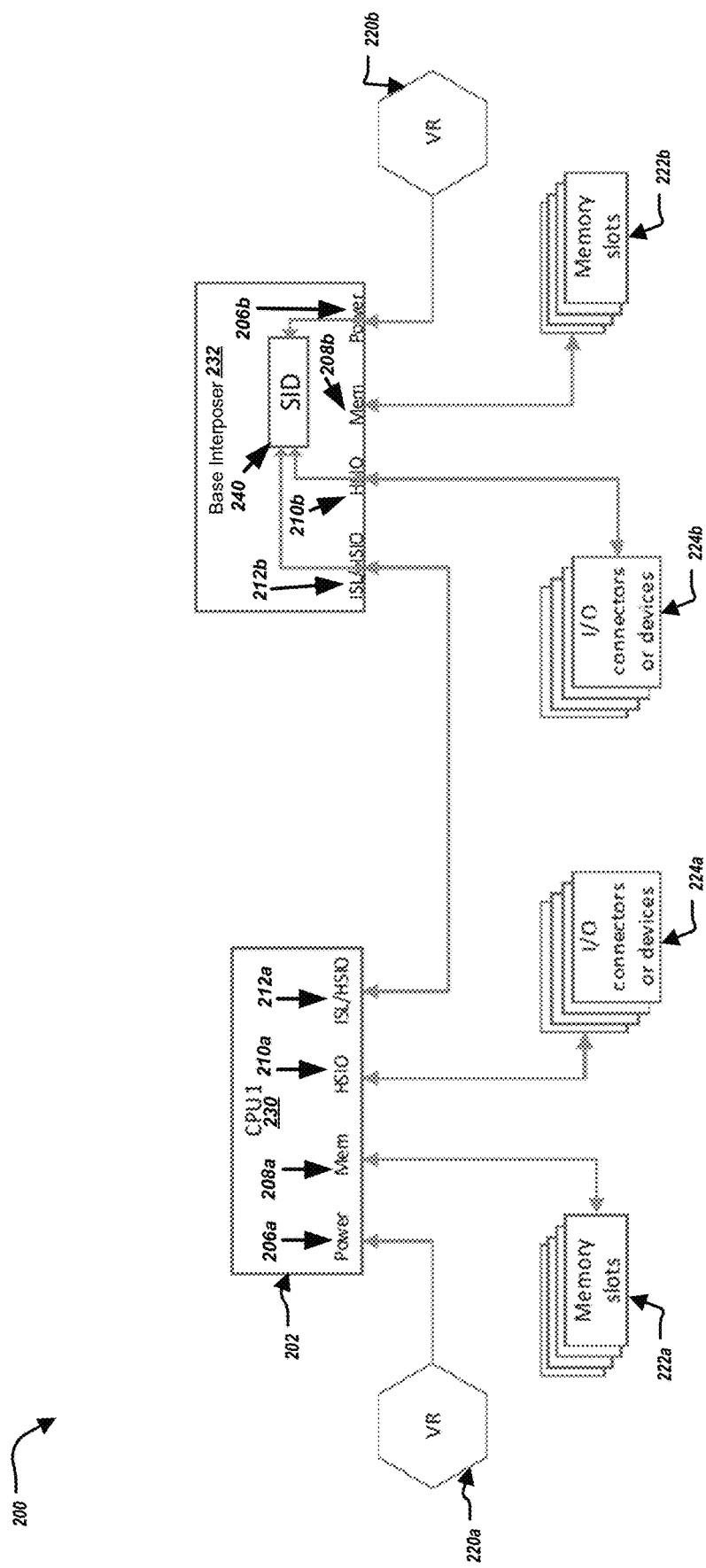

Referring to FIG. 2B, in some examples, the base interposer 232 can further include a signal integrity boost device (SID) 240. Specifically, if the signal between the ISL/HSIO connector 212b and the HSIO connector 210b is below a threshold, the signal integrity boost device 240 can boost (or amplify) such signal. For example, the SID 240 can be connected to the ISL/HSIO connector 212b and the HSIO connector 210b such that a signal between the ISL/HSIO connector 212b and the HSIO connector 210b is boosted. The SID 240 can include a retimer, a redriver, a bridge, a buffer, and/or a switch.

Figure 3A:
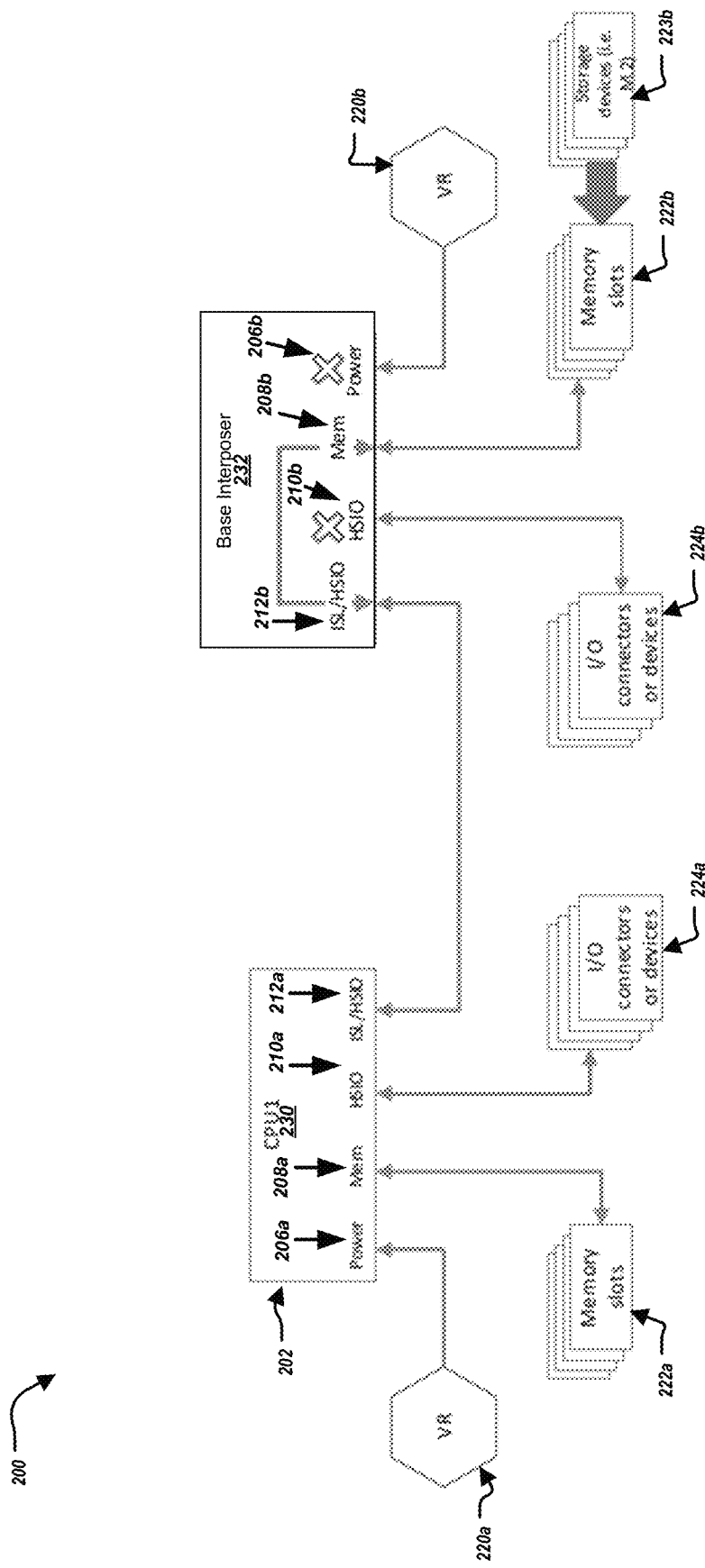

Referring to FIG. 3A, in some implementations, the ISL/HSIO connector 212b of the base interposer 232 is further connected to the memory bus connector 208b of the base interposer 232 (e.g., a "hairpin" connection). As a result, the ISL/HSIO connector 212a of the CPU 230 is connected to the memory bus connector 208b of the base interposer 232 through the ISL/HSIO connector 212b—e.g., the CPU 230 is connected to the memory signal traces of the base interposer 232. Further, this provides a connection between the CPU 230 and one or more memory slots 222b that are connected to the memory bus connector 208b of the base interposer 232. In some examples, the memory slots 222b are further connected to storage devices 223b. In short, signals are passed through from the CPU 230 to the memory bus connector 208b of the base interposer 232 from the (non-boot) second CPU socket 204 to the memory slots 222b. Furthermore, the power connector 206b can be connected to a voltage regulator 220b, and the HSIO connector 210b can be connected to the I/O connectors (or devices) 224b.

Figure 3B:
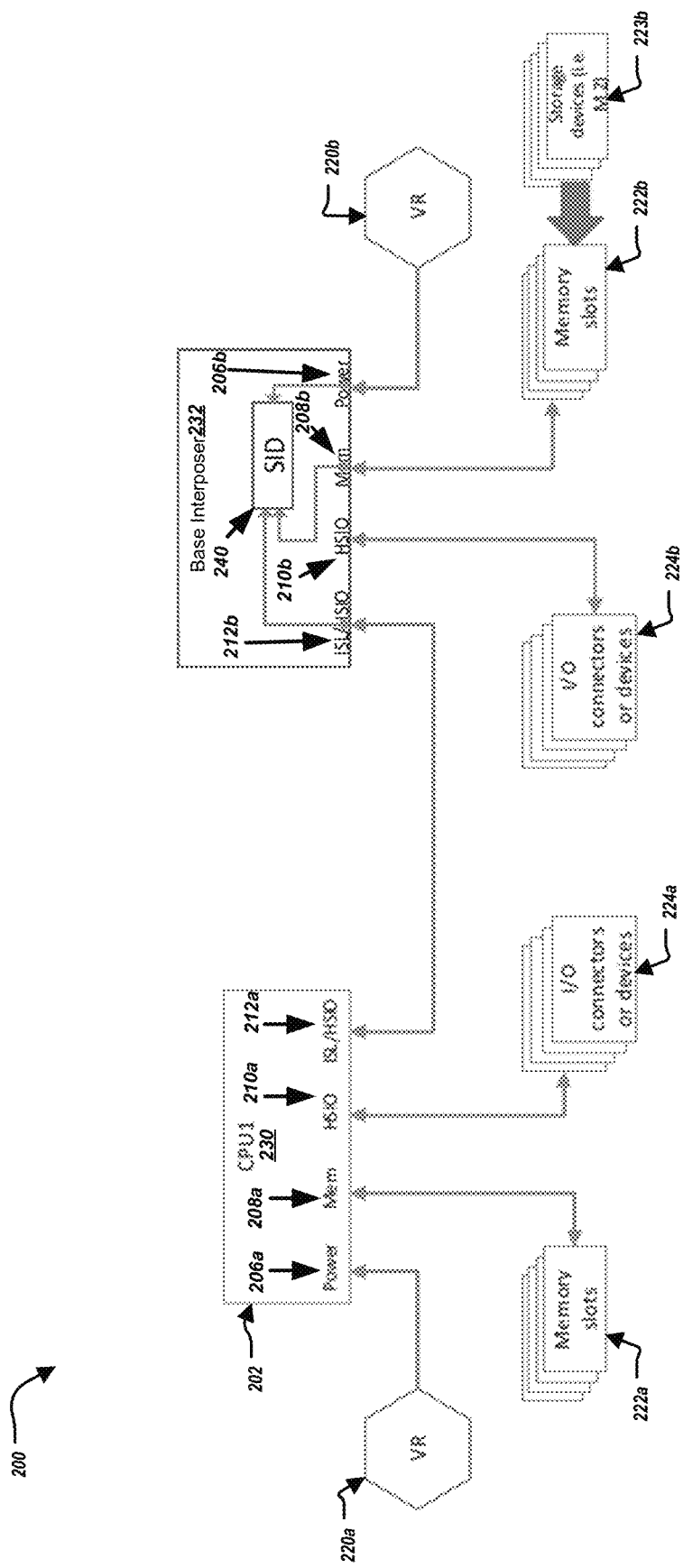

Referring to FIG. 3B, if the signal between the ISL/HSIO connector 212b and the memory bus connector 208b is below a threshold, the signal integrity boost device 240 can boost (or amplify) such signal. For example, the SID 240 can be connected to the ISL/HSIO connector 212b and the memory bus connector 208b such that a signal between the ISL/HSIO connector 212b and the memory bus connector is boosted.

Figure 4A:
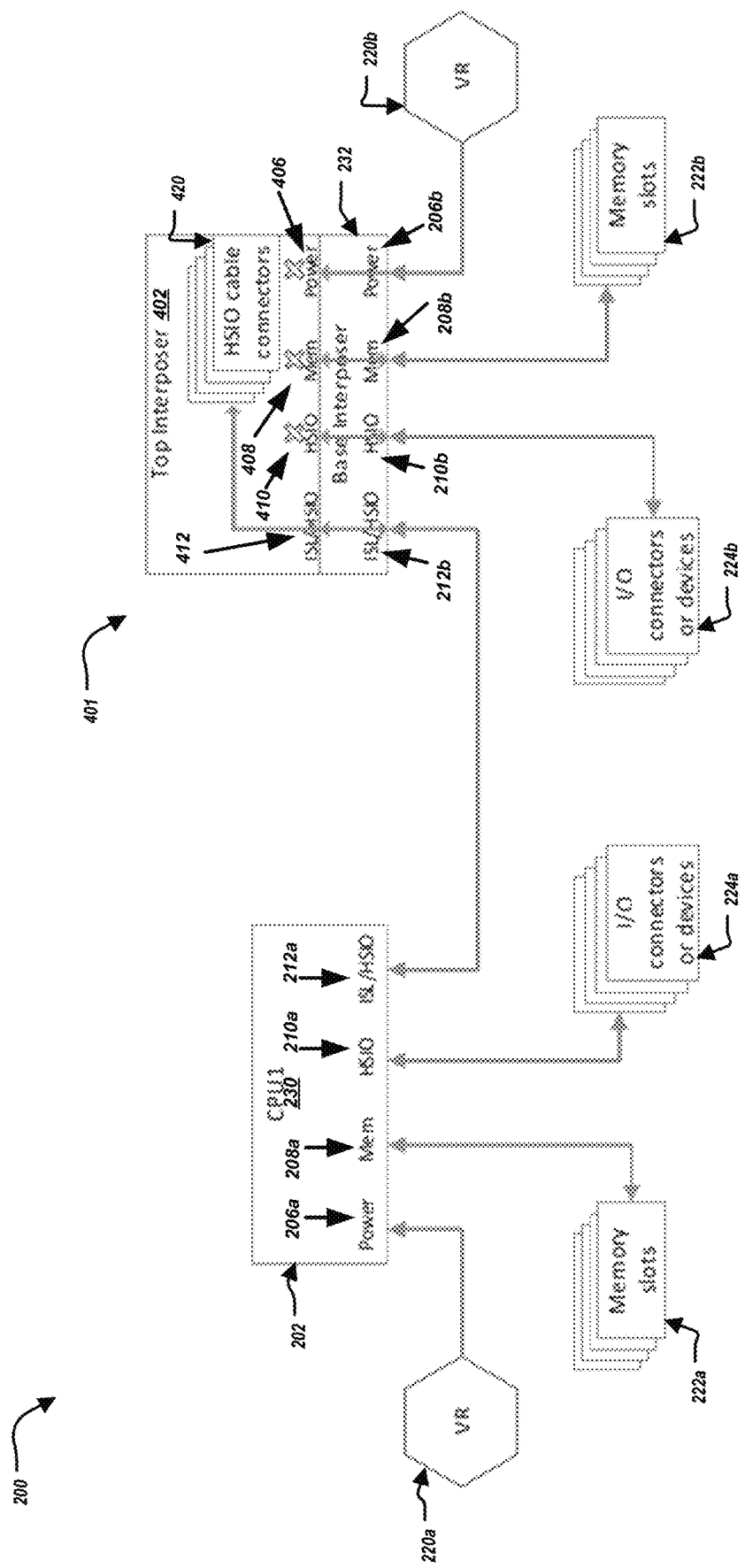

In some examples, referring to FIG. 4A, the interposer subsystem 170 can include an interposer stack 401. The interposer stack 401 can include the base interposer 232 and a top interposer 402. The top interposer 402 can be coupled to the base interposer 232. In short, the top interposer 402 connects to the bottom interposer 232 to obtain the signals from the devices in communication with the bottom interposer 232. The top interposer 402 is electrically, mechanically, and commutatively coupled to the bottom interposer 232. In some examples, the top interposer 402 is a high-density connector. In short, the top interposer 402 utilizes the lanes that were formerly dedicated to inter-processor links (between the CPU 230 and an additional CPU that would normally be coupled to the second CPU socket 204) for communication with other devices, described further herein. In some examples, the top interposer 402 can include a quantity of pins to carry four x16 PCIe busses including sideband signals (e.g., 512 pins plus sideband pins).

Similar to the base interposer 232, the top interposer 402 can include a power connector 406, a memory bus connector 408, a high speed input/output signal (HSIO) connector 410, and an inter-socket link (ISL/HSIO) connector 412. The power connector 406 can be connected to the power connector 206b of the bottom interposer 232, the memory bus connector 408 can be connected to the power connector 208b of the bottom interposer 232, the HSIO connector 410 can be connected to the HSIO connector 210b of the bottom interposer 232, and the ISL/HSIO connector 412 can be connected to the ISL/HSIO connector 212b of the bottom interposer 232.

In some implementations, the base interposer 232 provides a connection between the CPU 230 and the top interposer 402, and the one or more devices can be connected to the top interposer 402 such that the interposer stack 401 provides a connection between the CPU 230 and the devices. In some examples, the ISL/HSIO connector 412 of the top interposer 402 is further connected to high speed input/output (HSIO) cable connectors 420 (e.g., x8 Slimline SFF-8654). As a result, the ISL/HSIO connector 212b of the base interposer 232 is connected to the HSIO cable connectors 420 through the ISL/HSIO connector 412. Furthermore, this provides a connection between the CPU 230 and the HSIO cable connectors 420 through the ISL/HSIO connector 412 that is connected to the ISL/HSIO connector 212b of the bottom interposer 232. In short, the interposer stack 401 provides a direct route to the HSIO cable connectors 420 for the CPU 230, with the HSIO cable connectors 420 cabled to devices. Furthermore, the power connector 206b can be connected to the voltage regulator 220b, the memory bus connector 208b can be connected to one or more memory slots 222b, and the HSIO connector 210b can be connected to the I/O connectors (or devices) 224b.

Figure 4B:
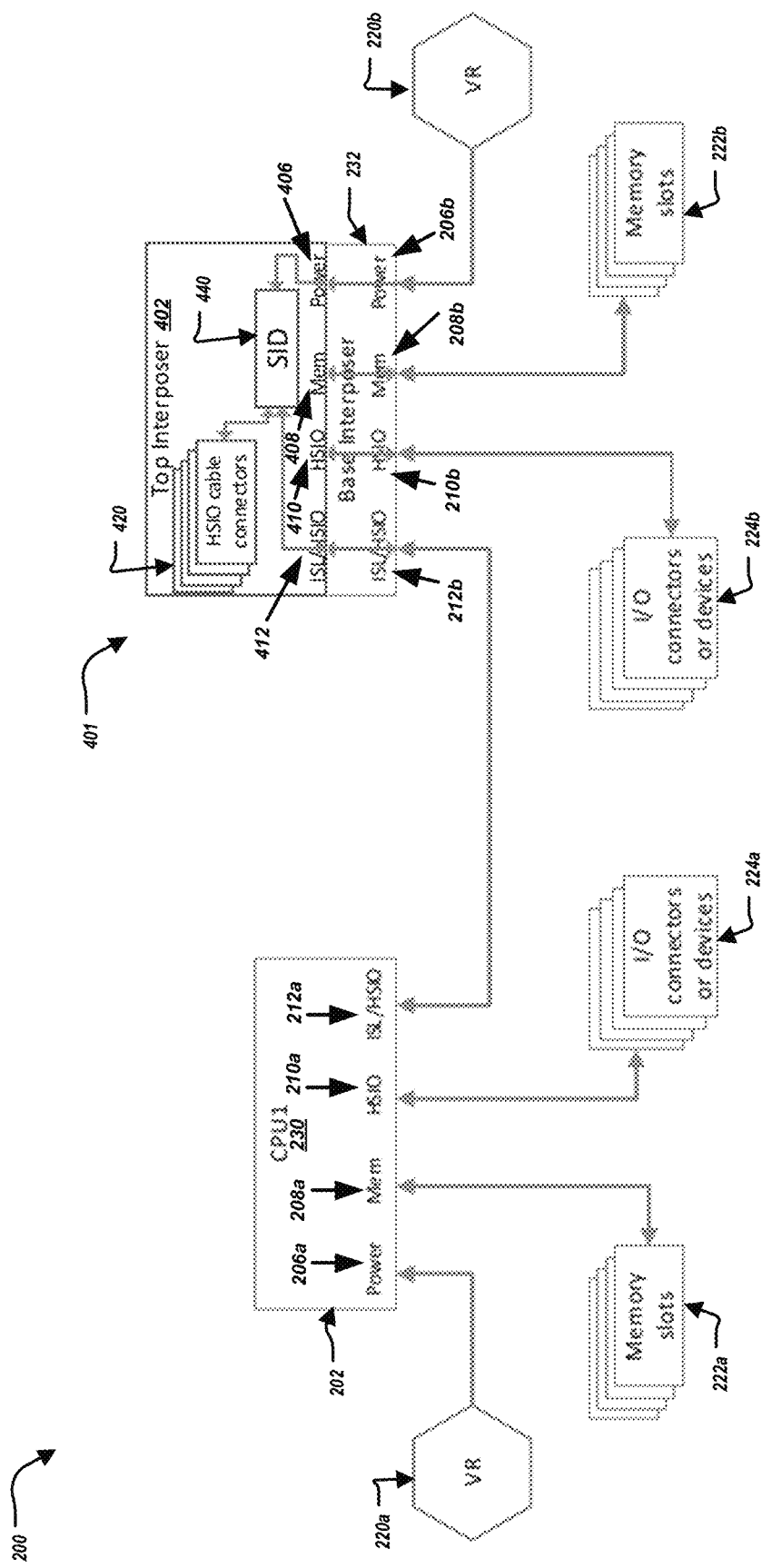

Referring to FIG. 4B, in some examples, the top interposer 402 can further include a signal integrity boost device (SID) 440. Specifically, if the signal between the ISL/HSIO connector 412 and the HSIO cable connectors 420 is below a threshold, the signal integrity boost device 440 can boost (or amplify) such signal. For example, the SID 440 can be connected to the ISL/HSIO connector 412 and the HSIO cable connectors 420 such that a signal between the ISL/HSIO connector 412 and the HSIO cable connectors 420 is boosted. The SID 440 can include a retimer, a redriver, a bridge, a buffer, and/or a switch.

Figure 5:
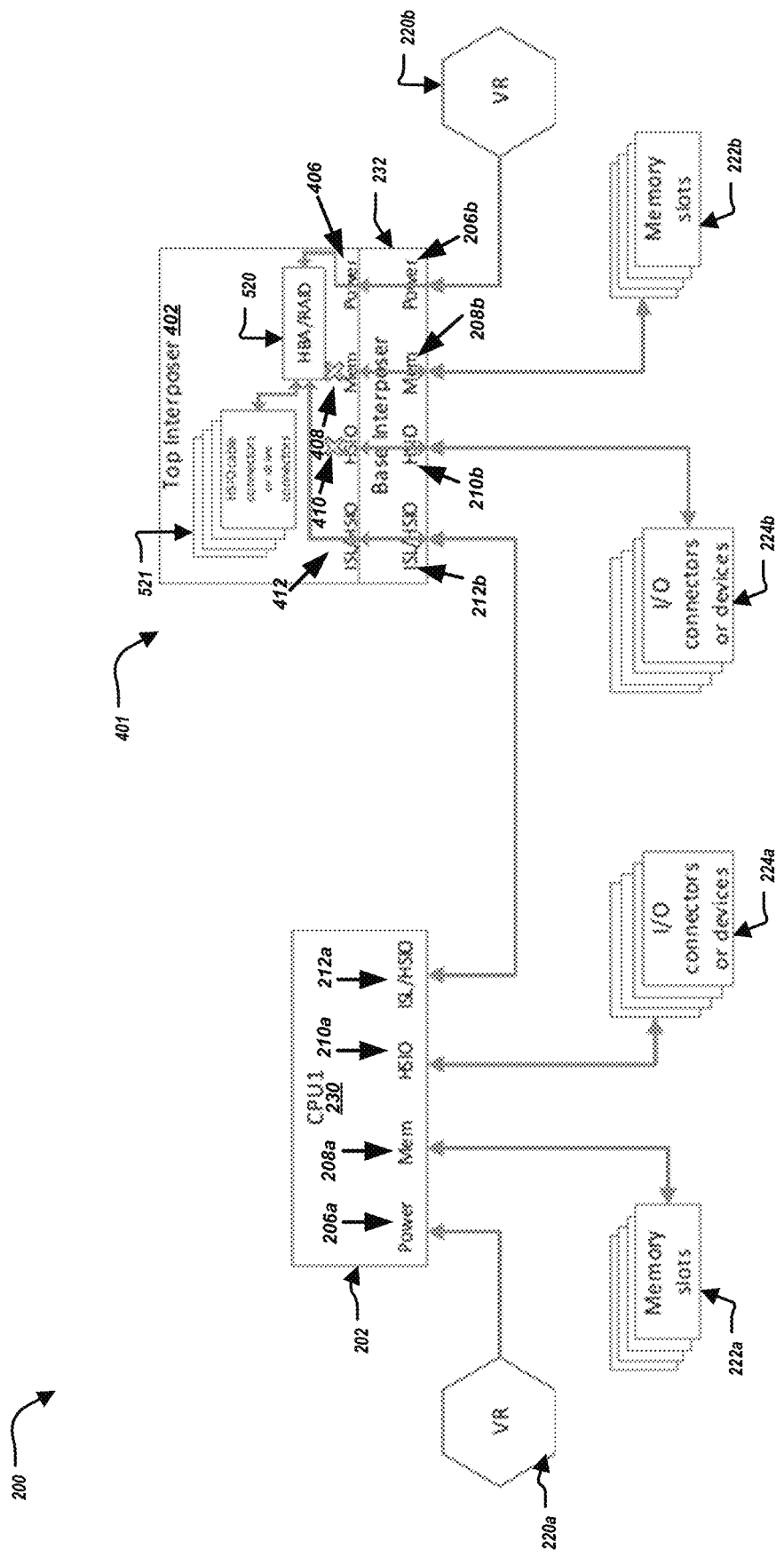

Referring to FIG. 5, in some implementations, the ISL/HSIO connector 412 of the top interposer 402 is further connected to a host bus adapter/redundant array of independent disks (HBA/RAID) module 520. As a result, the ISL/HSIO connector 212b of the base interposer 232 is connected to the HBA/RAID module 520 through the ISL/HSIO connector 412. Furthermore, this provides a connection between the CPU 230 and the HBA/RAID module 520 through the ISL/HSIO connector 212a that is connected to the ISL/HSIO connector 212b of the bottom interposer 232. Moreover, the HBA/RAID module 520 can be connected to HSIO cable connectors (or drive connectors) 521—e.g., storage device connections (SATA/SAS drives). In short, the interposer stack 401 provides a direct route to the HBA/RAID module 520 for the CPU 230, with the HBA/RAID module 520 connected to HSIO cable connectors 521. Furthermore, the power connector 206b can be connected to the voltage regulator 220b, the memory bus connector 208b can be connected to one or more memory slots 222b, and the HSIO connector 210b can be connected to the I/O connectors (or devices) 224b.

Figure 6:
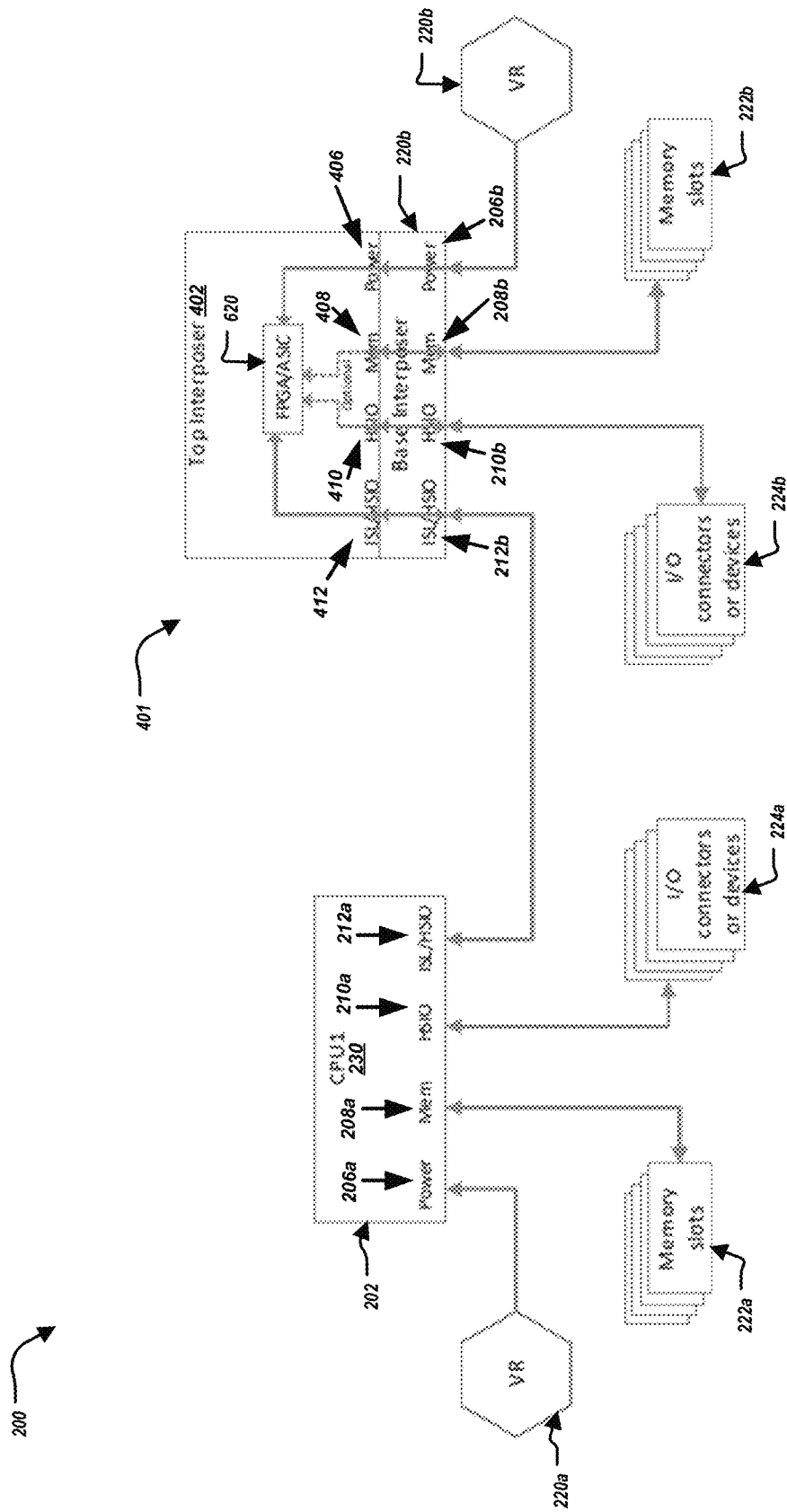

Referring to FIG. 6, in some implementations, the ISL/HSIO connector 412 of the top interposer 402 is further connected to a field-programmable gate array (FPGA)/application-specific integrated circuit (ASIC) 620. As a result, the ISL/HSIO connector 212b of the base interposer 232 is connected to the FPGA/ASIC 620 through the ISL/HSIO connector 412. Furthermore, this provides a connection between the CPU 230 and the FPGA/ASIC 620 through the ISL/HSIO connector 212a that is connected to the ISL/HSIO connector 212b of the bottom interposer 232. In some examples, the HSIO connector 410 and the memory bus connector 408 can be connected to the FPGA/ASIC 620. In short, the interposer stack 401 provides a direct route to the FPGA/ASIC 620 for the CPU 230. Furthermore, the power connector 206b can be connected to the voltage regulator 220b, the memory bus connector 208b can be connected to one or more memory slots 222b, and the HSIO connector 210b can be connected to the I/O connectors (or devices) 224b.

Figure 7A:
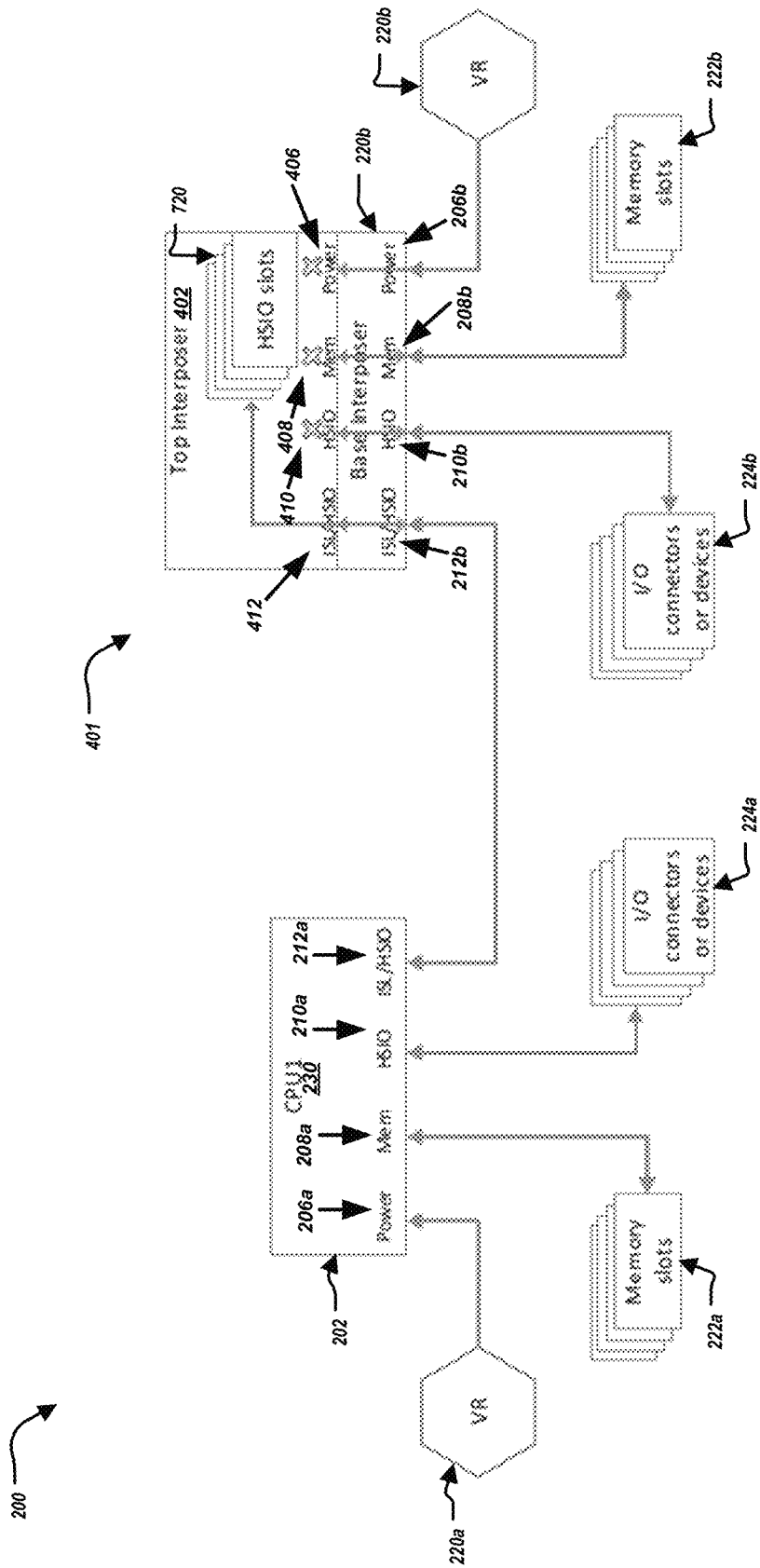

Referring to FIG. 7A, in some implementations, the ISL/HSIO connector 412 of the top interposer 402 is further connected to HSIO slots 720. As a result, the ISL/HSIO connector 212b of the base interposer 232 is connected to the HSIO slots 720 through the ISL/HSIO connector 412. Furthermore, this provides a connection between the CPU 230 and the HSIO slots 720 through the ISL/HSIO connector 212a that is connected to the ISL/HSIO connector 212b of the bottom interposer 232. Moreover, the HSIO slots 720 can be connected to peripheral component interconnect express (PCIe) devices—e.g., x16 PCIe. In short, the interposer stack 401 provides a direct route to the HSIO slots 720 for the CPU 230. Furthermore, the power connector 206*b* can be connected to the voltage regulator 220*b*, the memory bus connector 208*b* can be connected to one or more memory slots 222*b*, and the HSIO connector 210*b* can be connected to the I/O connectors (or devices) 224*b*.

Figure 7B:
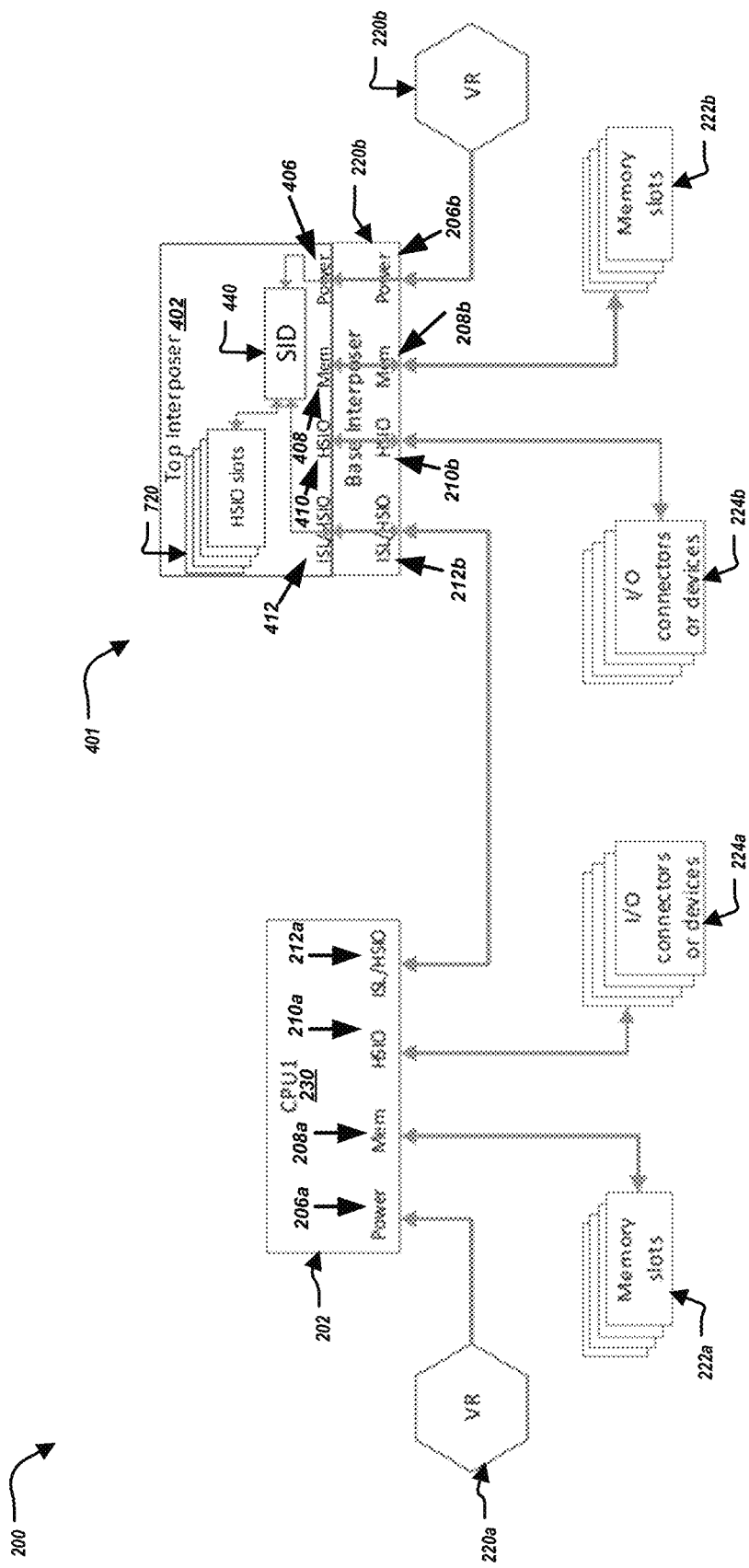

Referring to FIG. 7B, in some examples, if the signal between the ISL/HSIO connector 412 and the HSIO slots 720 is below a threshold, the signal integrity boost device 440 can boost (or amplify) such signal. For example, the SID 440 can be connected to the ISL/HSIO connector 412 and the HSIO slots 720 such that a signal between the ISL/HSIO connector 412 and the HSIO slots 720 is boosted.

Figure 8:
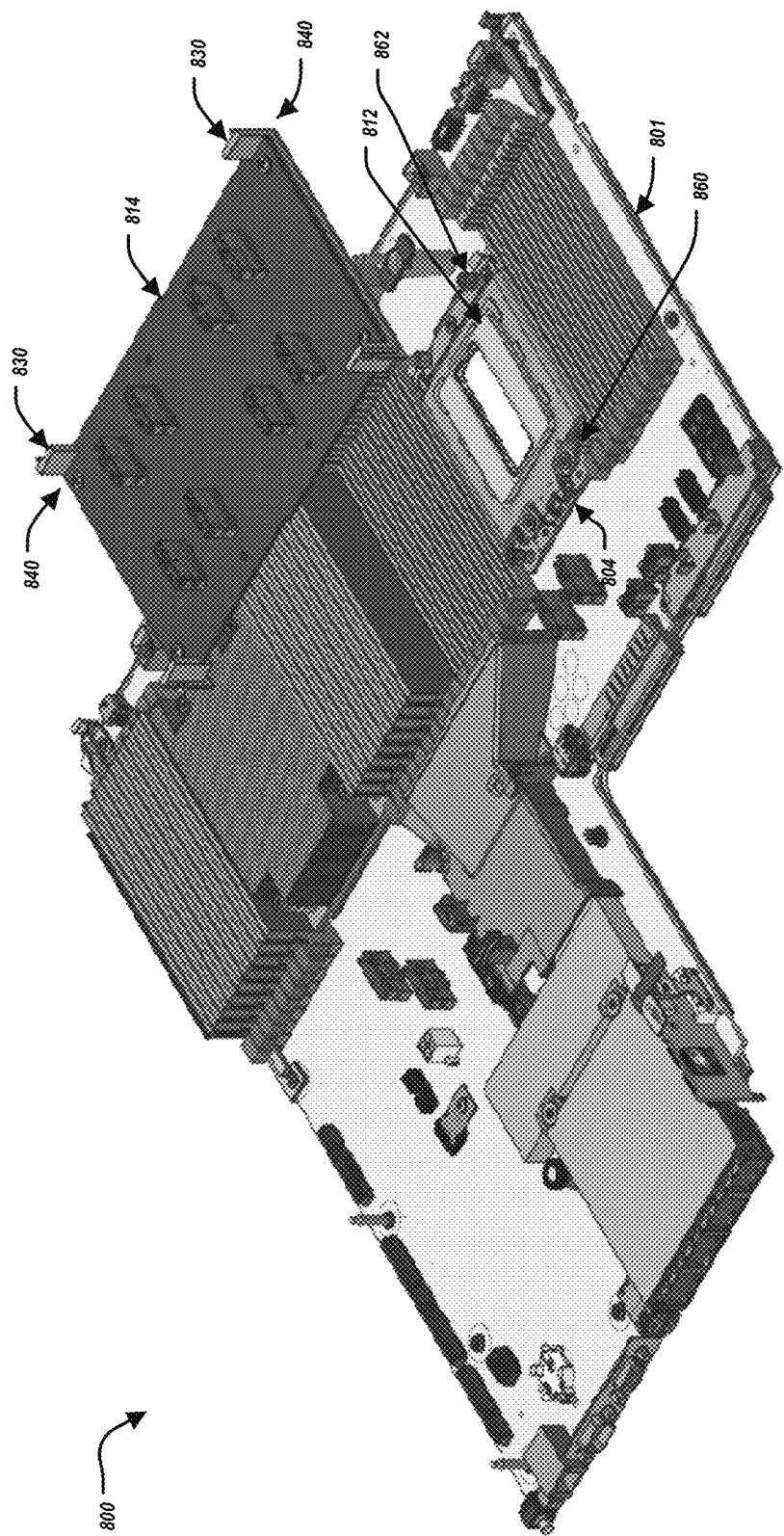
FIGS. 8, 9 illustrate a mechanical coupling between the interposer and a printed circuit board.

Referring to FIG. 8, a computing apparatus 800 is shown. The computing apparatus 800 can include a PCB 801 that includes a first CPU socket (not shown) that is similar to the first CPU socket 202 of FIG. 1, and a second CPU socket 804 that is similar to the second CPU socket 204 of FIG. 1. The apparatus 800 further includes a CPU (not shown), similar to the CPU 230 of FIG. 1, coupled to the first CPU socket 802. The apparatus 800 further includes an interposer stack that includes a base interposer 812 coupled to the second CPU socket 804 and a top interposer 814 coupled to the base interposer 812. The base interposer 812 and the top interposer 814 can be similar to the base interposer 232 of FIG. 2 and the top interposer 402 of FIG. 4, respectively.

In some examples, a retention mechanism 830 physically couples the top interposer 814 to the PCB 801. Specifically, when extra support is needed for the top interposer 814 (e.g., to provide mechanical coupling between the interposer stack 810 and the second CPU socket 804), the retention mechanism 830 can provide such extra support. In some examples, the retention mechanism 830 can include brackets coupled to the corners 840 of the top interposer 814 that physically couple the top interposer 814 to the PCB 801.

Figure 9:
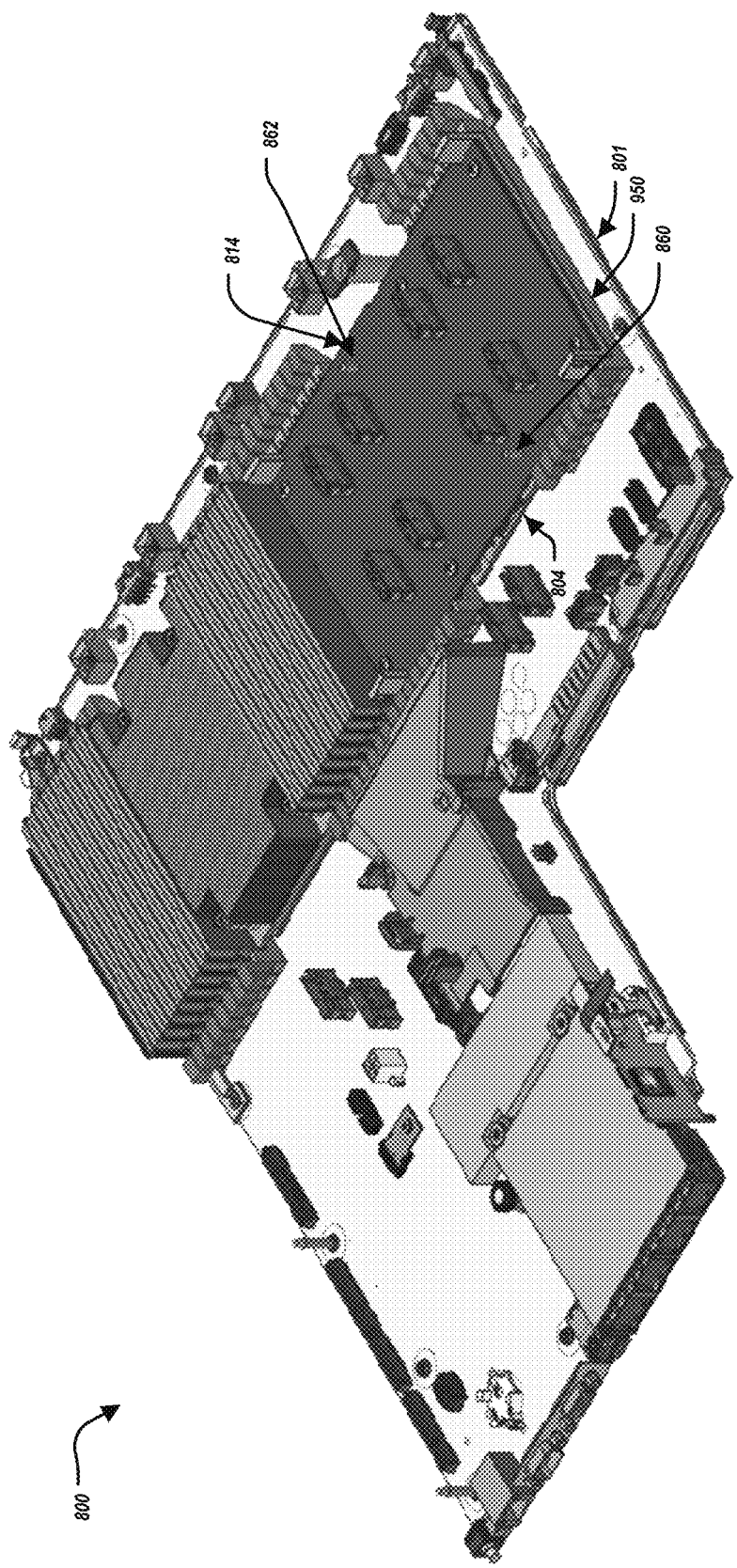

Referring to FIG. 9, the top interposer 814 is shown coupled to the PB 801. Specifically, the apparatus 800 can include memory sockets 950 (e.g., DIMM sockets) that the brackets of the retention mechanism 830 physically couple the top interposer 814 to. In other words, the brackets of the retention mechanism 830 clip into the memory sockets 950, e.g., clip into the latching mechanism of the memory sockets 950, such that the corners 840 are retained by the memory sockets 950.

Referring back to FIG. 8, the apparatus 800 further includes heat sink mounting pins 860 and screw holes 862. To that end, the top interposer 814 can further be physically coupled to the pins 860 and the screw holes 862, as shown in FIG. 9. The pins 860 and/or the screw holes 862 can facilitate alignment between the top interposer 814 and the base interposer 812.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computing apparatus, comprising:
 a printed circuit board (PCB) including a first central processing unit (CPU) socket and additional CPU socket(s), the first CPU socket including a first inter-socket link connector;
 a CPU coupled to the first CPU socket;
 a base interposer coupled to the additional CPU socket(s), the base interposer including a second inter-socket link and a high-speed input/output signal connector, the second inter-socket link of the base interposer connected to the high-speed input/output signal connector of the same base interposer; and
 one or more devices connected to the base interposer,
 wherein the second inter-socket link of the base interposer provides a connection to both i) the first inter-socket link connector of the first CPU socket and ii) the high-speed input/output signal connector of the base interposer such that the first inter-socket link connector of the first CPU socket is additionally connected to the high-speed input/output signal connector of the base interposer via the second inter-socket link of the baser interposer,
 wherein the base interposer provides a connection between the CPU and the one or more devices.

2. The computing apparatus of claim 1, wherein the one or more devices include input/output devices and the base interposer provides the connection between the CPU and the input/output devices.

3. The computing apparatus of claim 2, wherein the connection between the CPU and the input/output devices includes a connection between the CPU and input/output signal traces of the base interposer.

4. The computing apparatus of claim 1, wherein the one or more devices include memory modules or devices using memory module sockets and the base interposer provides the connection between the CPU and the memory modules or sockets.

5. The computing apparatus of claim 4, wherein the connection between the CPU and the memory modules includes a connection between the CPU and memory signal traces of the base interposer.

6. The computing apparatus of claim 1, further comprising:
- a top interposer coupled to the base interposer,
- wherein the base interposer provides a connection between the CPU and the top interposer, and the top interposer provides a connection between the base interposer and the one or more devices.

7. The computing apparatus of claim 6, wherein the one or more devices include input/output cable connectors and the top interposer provides the connection between the CPU and the input/output cable connectors.

8. The computing apparatus of claim 6, wherein the one or more devices include storage devices, and the top interposer provides the connection between the CPU and the storage devices.

9. The computing apparatus of claim 6, where the one or more devices include a field-programmable gate array (FPGA) devices, and the top interposer provides the connection between the CPU and the FPGA devices.

10. The computing apparatus of claim 6, wherein the one or more devices includes a peripheral component interconnect express (PCIe) devices, and the top interposer provides the connection between the CPU and the PCIe devices.

11. The computing apparatus of claim 6, wherein the top interposer further includes a signal integrity boost device.

12. A computing apparatus, comprising:
- a printed circuit board (PCB) including a first central processing unit (CPU) socket additional CPU socket(s), the first CPU socket including a first inter-socket link connector;
- a CPU coupled to the first CPU socket; and
- an interposer stack including:
  - a base interposer coupled to the additional CPU socket(s), the base interposer including a second inter-socket link and a high-speed input/output signal connector, the second inter-socket link of the base interposer connected to the high-speed input/output signal connector of the same base interposer;
  - a top interposer coupled to the base interposer, wherein a retention mechanism physically couples the top interposer to the PCB,
  - wherein the second inter-socket link of the base interposer provides a connection to both i) the first inter-socket link connector of the first CPU socket and ii) the high-speed input/output signal connector of the base interposer such that the first inter-socket link connector of the first CPU socket is additionally connected to the high-speed input/output signal connector of the base interposer via the second inter-socket link of the base interposer.

13. The computing apparatus of claim 12, wherein the retention mechanism includes a bracket coupled to the top interposer, the bracket physically coupling the top interposer to the PCB.

14. The computing apparatus of claim 13, further comprising a plurality of memory sockets, wherein the bracket physically couples the top interposer to the memory sockets.

15. The computing apparatus of claim 12, further comprising a plurality of heat sink mounting pins, wherein the top interposer is physically coupled to the heat sink mounting pins.

16. The computing apparatus of claim 15, wherein the heat sink mounting pins align the top interposer with the base interposer.

17. The computing apparatus of claim 12, further comprising one or more devices connected to the top interposer, wherein the top interposer provides a connection between the CPU and the one or more devices.

\* \* \* \* \*